United States Patent
Tame et al.

(10) Patent No.: US 6,322,036 B1
(45) Date of Patent: Nov. 27, 2001

(54) SEAT TRACK ASSEMBLY HAVING A LOCKING MECHANISM WITH INFINITE ENGAGEMENT

(75) Inventors: Omar D. Tame, West Bloomfield; Kirk M. Nicola, Beverly Hills; James Weber, West Bloomfield, all of MI (US)

(73) Assignee: Magna Seating Systems, Inc., Aurora (CA)

(*) Notice: Subject to any disclaimer, the term of this patent is extended or adjusted under 35 U.S.C. 154(b) by 0 days.

(21) Appl. No.: 09/692,836

(22) Filed: Oct. 19, 2000

Related U.S. Application Data
(60) Provisional application No. 60/160,287, filed on Oct. 19, 1999.

(51) Int. Cl.[7] ....................................... F16M 13/00
(52) U.S. Cl. ........................ 248/429; 297/344.11
(58) Field of Search ................... 248/424, 429, 248/430; 74/527; 297/344.11

(56) References Cited

U.S. PATENT DOCUMENTS

| | | |
|---|---|---|
| 4,189,957 | 2/1980 | Gedig et al. . |
| 4,712,759 | 12/1987 | Sugame et al. . |
| 4,720,072 | 1/1988 | Kitano et al. . |
| 4,730,804 | 3/1988 | Higuchi et al. . |
| 4,750,758 | 6/1988 | Yamamoto et al. . |
| 4,961,559 | 10/1990 | Raymor . |
| 5,156,438 | 10/1992 | Hayakawa et al. . |
| 5,234,189 | 8/1993 | Myers . |
| 5,286,076 * | 2/1994 | Devoss et al. .................. 248/429 |
| 5,524,504 | 6/1996 | Brandoli et al. . |
| 5,596,910 * | 1/1997 | Bauer et al. .................... 297/429 |
| 5,782,138 | 7/1998 | Groche . |
| 5,785,292 | 7/1998 | Muraishi et al. . |
| 5,913,947 | 6/1999 | Groche . |
| 6,216,995 * | 4/2001 | Koester ........................... 248/429 |

FOREIGN PATENT DOCUMENTS

| | | |
|---|---|---|
| 4337293-C1 * | 12/1994 | (DE) . |
| 4403310-A1 * | 8/1995 | (DE) . |

* cited by examiner

*Primary Examiner*—Ramon O. Ramirez
*Assistant Examiner*—Korie Chan
(74) *Attorney, Agent, or Firm*—Clark Hill PLC (57) ABSTRACT

A seat track assembly for adjusting a seat assembly of an automotive vehicle. The seat track assembly comprises a lower track and slidably coupled to an upper track. A locking mechanism includes a fixed lock plate secured to the lower track and having a first plurality of apertures. A moving lock plate is secured to the upper track and includes spaced apart and parallel upper and lower locking plates sandwiched on opposing sides of the fixed lock plate. Each of the upper and lower locking plates include a second plurality of apertures for aligning with the apertures in the fixed lock plate. A housing is mounted to the moving lock plate above the apertures. A pair of shear plates are slidably disposed within the housing and have opposing offset engagement fingers. The shear plates are biased to a locked position for selectively engaging the first and second apertures to lock and secure the upper track to the lower track. The shear plates are moveable to an unlocked position disengaged from the first and second apertures enabling the sliding movement between the upper track and the lower track. Additionally, at least one of the shear plates is engageable with the first and second apertures regardless of a relative position between the upper track and the lower track to provide infinite engagement of the locking mechanism between the upper and lower tracks.

14 Claims, 11 Drawing Sheets

SEAT TRACK ASSEMBLY HAVING A LOCKING MECHANISM WITH INFINITE ENGAGEMENT

This application claims benefit of Provisional Application Ser. No. 60/160,287 filed Oct. 19, 1999.

BACKGROUND OF THE INVENTION

1. Field of Invention

The subject invention relates to a seat track assembly for a seat assembly of an automotive vehicle. More particularly, the subject invention relates to a seat track assembly having a locking mechanism with a plurality of shear plates movable between a locked position wherein at least one of the plates interlocks upper and lower tracks of the seat track assembly and an unlocked position disengaged from the tracks to allow sliding movement therebetween.

2. Description of the Related Art

Locking mechanism are commonly known in the art for interlocking the upper track and lower track of a manual seat track assembly to prevent relative fore and aft sliding movement therebetween. One type of locking mechanism known in the art utilizes a locking plate operatively secured to the upper track and having a projecting finger for aligning with and engaging an aperture within the lower track to interlock the upper and lower tracks. Examples of these type of locking mechanisms are disclosed in U.S. Pat. Nos. 4,189,957; 4,635,890 and 4,961,559.

However, these locking mechanism are limited in their range of engagement caused by the necessary alignment of the projecting finger with the aperture. That is, the occupant of a seat assembly must properly position the upper track along the lower track until the projecting finger is aligned with the aperture to engage therewith and interlock the upper and lower tracks. This alignment necessity limits the range of adjustable travel of the seat assembly by the seat tracks as well as the range of engagement of the locking mechanism. Further, if the projecting finger is not properly aligned with the aperture, a possibility exists that the upper and lower tracks will not interlock and prevent incidental fore and aft movement of the seat assembly.

Therefore, it is desirable to provide a seat track assembly having a locking mechanism which provides for infinite engagement between the upper and lower track to interlock the tracks and prevent fore and aft movement of the seat assembly.

SUMMARY OF THE INVENTION

The present invention relates to a seat track assembly for adjusting a seat assembly of an automotive vehicle. The seat track assembly comprises a lower track having a first plurality of apertures and an upper track slidably mounted to the lower track and having a second plurality of apertures. A housing is mounted to the upper track. At least two shear plates are slidably disposed within the housing and have opposing offset engagement fingers. The shear plates are biased to selectively engage the first and second apertures to lock and secure the upper track to the lower track. The shear plates are moveable to an unlocked position disengaged from the first and second apertures enabling the sliding movement between the upper track and the lower track and at least one of the shear plates is engageable with the first and second apertures regardless of a relative position between the upper track and the lower track.

BRIEF DESCRIPTION OF THE DRAWINGS

Other advantages of the present invention will within be readily appreciated as the same becomes better understood by reference to the following detailed description when considered in connection with the accompanying drawings wherein.

DETAILED DESCRIPTION OF THE PREFERRED EMBODIMENT

Figure 1:
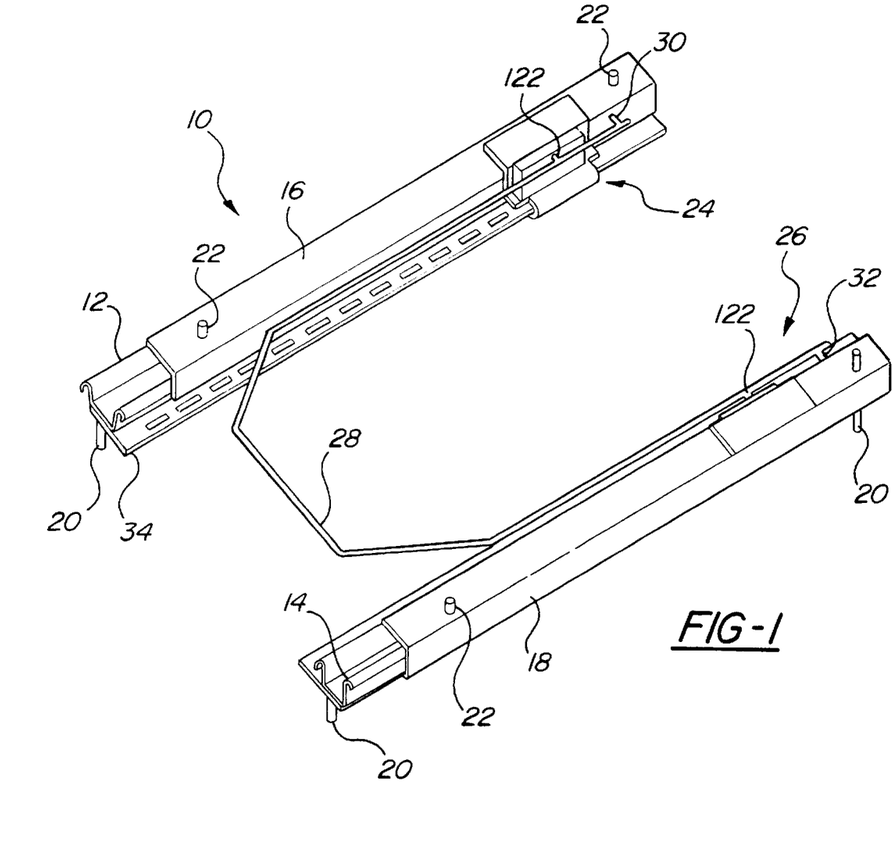
FIG. 1 is a perspective view of a seat track assembly according to the subject invention.

Referring to FIG. 1, a seat track assembly for use in an automotive vehicle is generally shown at 10. The seat track assembly 10 supports a seat assembly with the vehicle and provides both fore and aft sliding adjustment of the seat assembly. The seat track assembly includes a pair of spaced apart and parallel longitudinally extending lower tracks 12, 14 and a pair of spaced apart and parallel longitudinally extending upper tracks 16, 18 slidably coupled to the respective lower tracks 12, 14. The lower tracks 12, 14 include a plurality of mounting fasteners 20 for fixedly securing the track assembly 10 within the vehicle. Similarly, the upper tracks 16, 18 include a plurality of mounting fasteners 22 for fixedly mounting the seat assembly to the track assembly 10 as is commonly known to one skilled in the art. The upper tracks 16, 18 have a complementary cross-section shape to the lower tracks 12, 14 and are slidably disposed along the lower tracks 12, 14 for providing sliding fore and aft adjustment of the seat assembly mounted thereto. The upper and lower tracks may be of any suitable design or configuration as is known in the art, including those described in U.S. Pat. Nos. 5,046,698; 5,597,206; 5,732,923; and 5,741,000, the disclosures of which are incorporated herein by reference.

The seat track assembly 10 further includes a pair of locking mechanisms 24, 26 for interlocking the upper tracks 16, 18 with the respective lower tracks 12, 14 along the longitudinal length thereof. The locking mechanism 24 is coupled between the upper track 16 and lower track 12. The locking mechanism 26 is coupled between the upper track 18 and lower track 14. A release handle 28 extends between and interconnects the locking mechanisms 24, 26 to synchronize actuation of the locking mechanisms 24, 26 between a released condition allowing sliding movement between the upper tracks 16, 18 and lower tracks 12, 14 and a locked condition preventing movement between the upper tracks 16, 18 and lower tracks 12, 14. The release handle 28 is generally U-shaped extends between a first end pivotally connected by pivot pin 30 to the upper track 16 and a second end pivotally connected by pivot pin 32 to the upper track 18. The upper tracks 16, 18; lower tracks 12, 14; and locking mechanisms 24, 26 are substantially identical and mirror images of one another, and therefore, only tracks 12, 16 and locking mechanism 24 will be described in detail.

Figure 2:
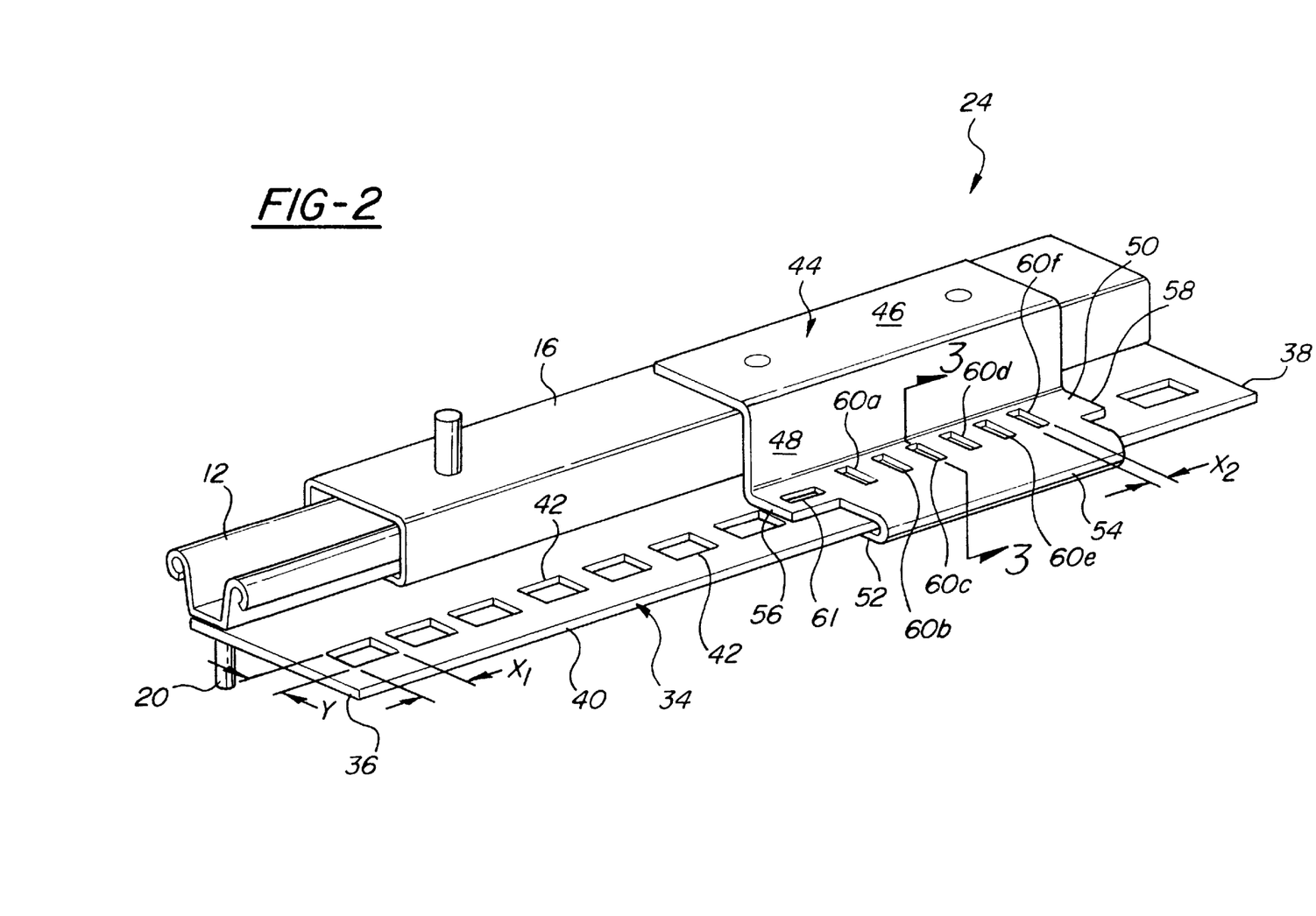
FIG. 2 is a perspective view of the upper and lower tracks of the seat track assembly.

Referring to FIG. 2, the locking mechanism 24 includes a fixed lock plate 34 secured to the lower track 12. More specifically, the fixed lock plate 34 is a generally planar plate fixedly secured to the bottom of the lower track 12 and extending the longitudinal length thereof between a first end 36 and opposite second end 38. The fixed lock plate 34 further projects or extends laterally outwardly from the lower track 12, toward the opposite lower track 14 as shown in FIG. 1, to a lateral edge 40 extending longitudinally between the first 36 and second 38 ends. The lock plate 34 further includes a plurality of spaced apart locking apertures 42 extending through the lock plate 34. The apertures 42 are spaced between the lateral edge 40 and the side of the lower track 12 and extend along a linear path between the first end 36 and second end 38. Each of the apertures 42 has a common predetermined length designated as X1 and a common predetermined width designated as Y.

Still referring to FIG. 2, the locking mechanism 24 further includes a moving lock plate 44 secured to the upper track 16. The moving lock plate 44 has a generally S-shaped cross-section and includes a top horizontal plate 46 fixedly secured to the top surface of the upper track 16 by fasteners, rivets, welds, or the like and a side vertical plate 48 extending generally perpendicularly from the top plate 46 to the fixed lock plate 34. The moving lock plate 44 further includes an upper locking plate 50 extending generally perpendicularly from the side plate 48 adjacent the top surface of the fixed lock plate 34 and a lower locking plate 52 generally parallel to the upper locking plate 50 adjacent the bottom surface of the fixed lock plate 34. The upper locking plate 50 and lower locking plate 52 are joined by a C-shaped portion 54 curling around the lateral edge 40 of the fixed lock plate 34. The upper 50 and lower 52 locking plates extend along a longitudinal portion of the fixed lock plate 34 between a front edge 56 and a rear edge 58. The upper locking plate 50 includes a plurality of spaced apart first alignment apertures 60a–f extending through the locking plate 50. The apertures 60a–f are spaced between the side plate 48 and C-shaped portion 54 and extend along a linear path between the front edge 56 and rear edge 58. Each of the apertures 60a–f has a predetermined width, designated as X2, which is approximately half of the length X1 of the apertures 42. The upper locking plate 50 further includes a cam slot 61 passing therethrough and aligned generally perpendicular to the length of the apertures 60a–f. The lower locking plate 52 similarly includes a plurality of spaced apart second alignment apertures 62a–f extending through the locking plate 52, best shown in FIG. 5. The second apertures 62a–f are aligned vertically with the first apertures 60a–f, respectively, and have the same predetermined width X2. In the preferred embodiment, the moving lock plate 44 includes six equally spaced apart first and second alignment apertures 60, 62 in the respective upper 50 and lower 52 locking plates, however, it should be appreciated that the number of apertures 60, 62 may vary.

Figure 3:
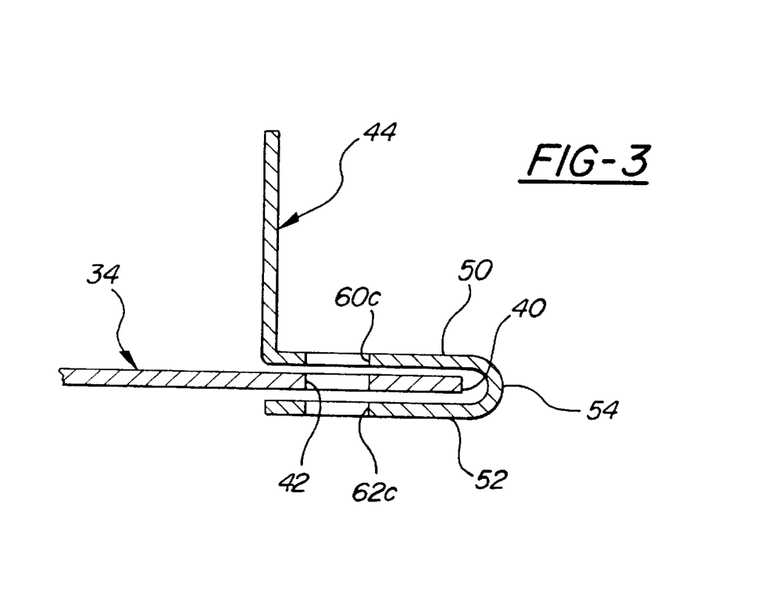
FIG. 3 is a cross-sectional view taken along line 3—3 of FIG. 2.

Referring to FIG. 3, a cross-sectional view is shown taken along line 3—3 of FIG. 2 showing the relationship of the fixed lock plate 34 seated between the upper locking plate 50 and lower locking plate 52 such that the apertures 42, 60, 62 are generally vertically aligned.

Figure 4:
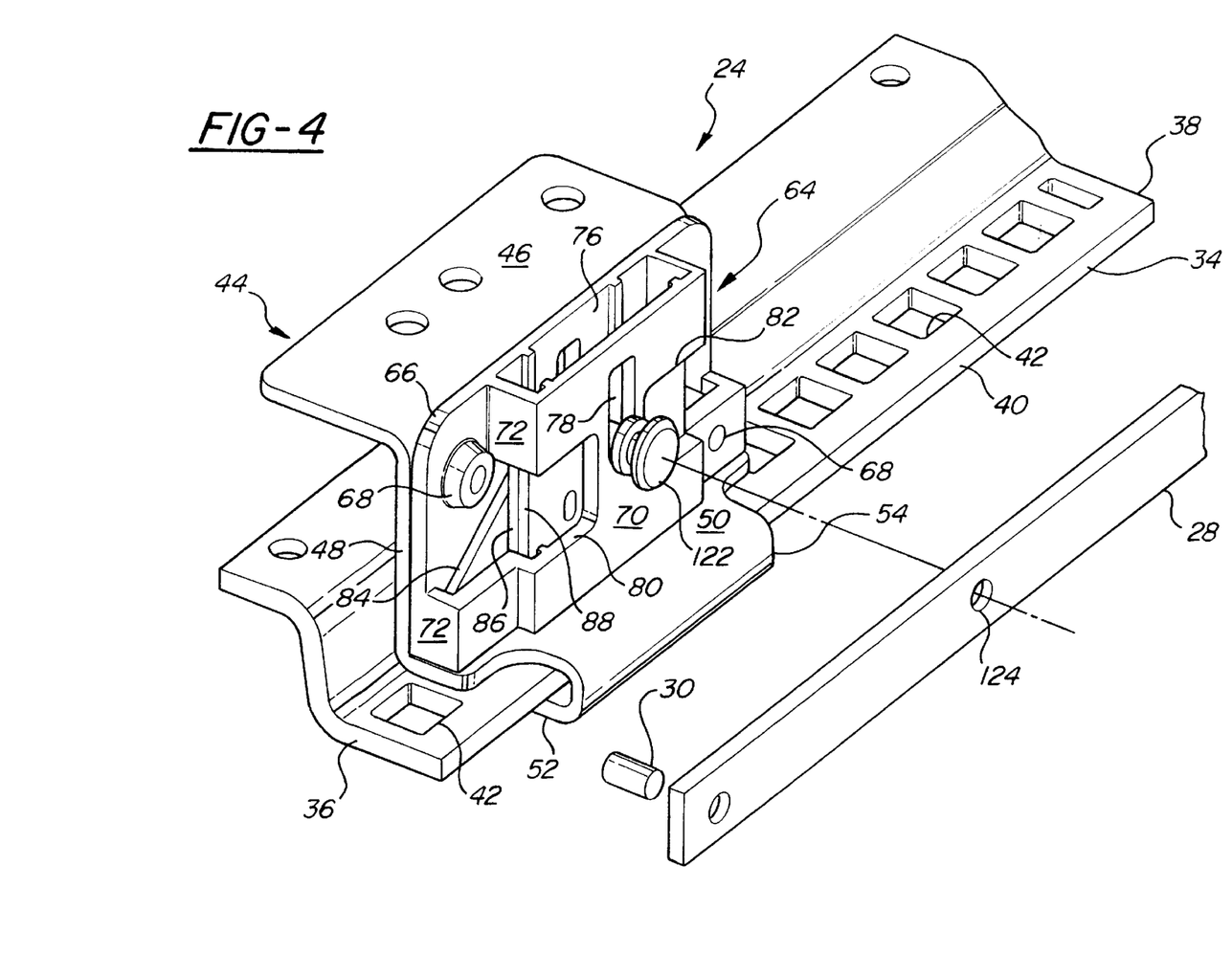
FIG. 4 is a partially exploded perspective view of a locking mechanism according to the subject invention.
Figure 5:
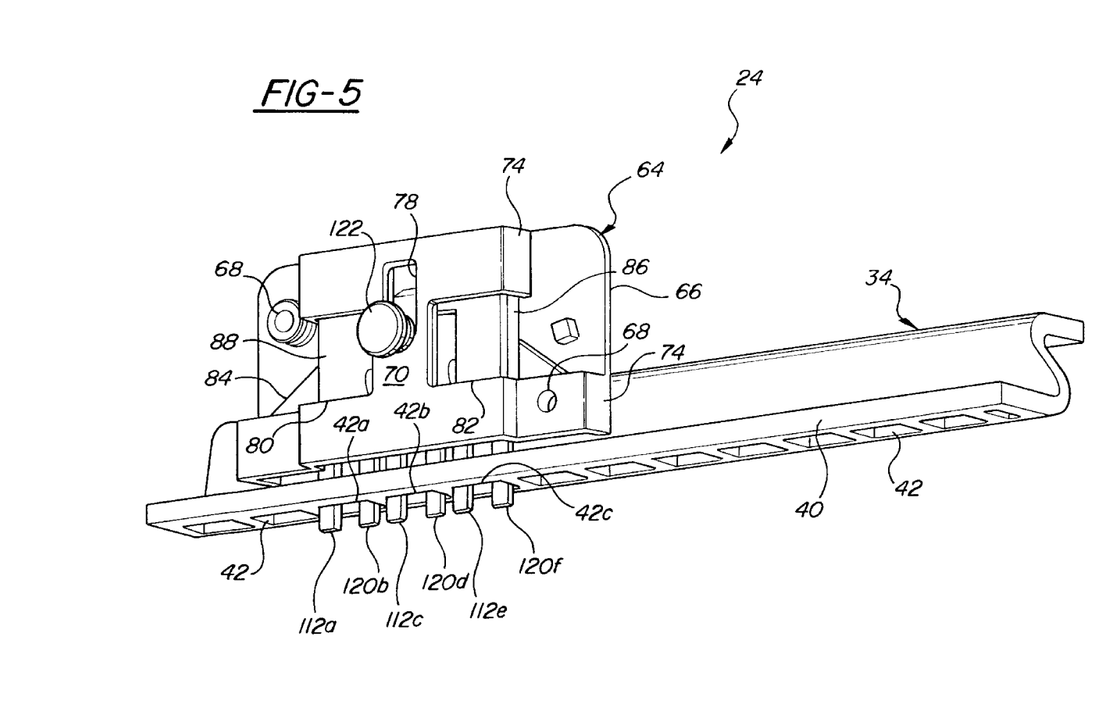
FIG. 5 is another perspective view of the locking mechanism with a moving lock plate removed.
Figure 6:
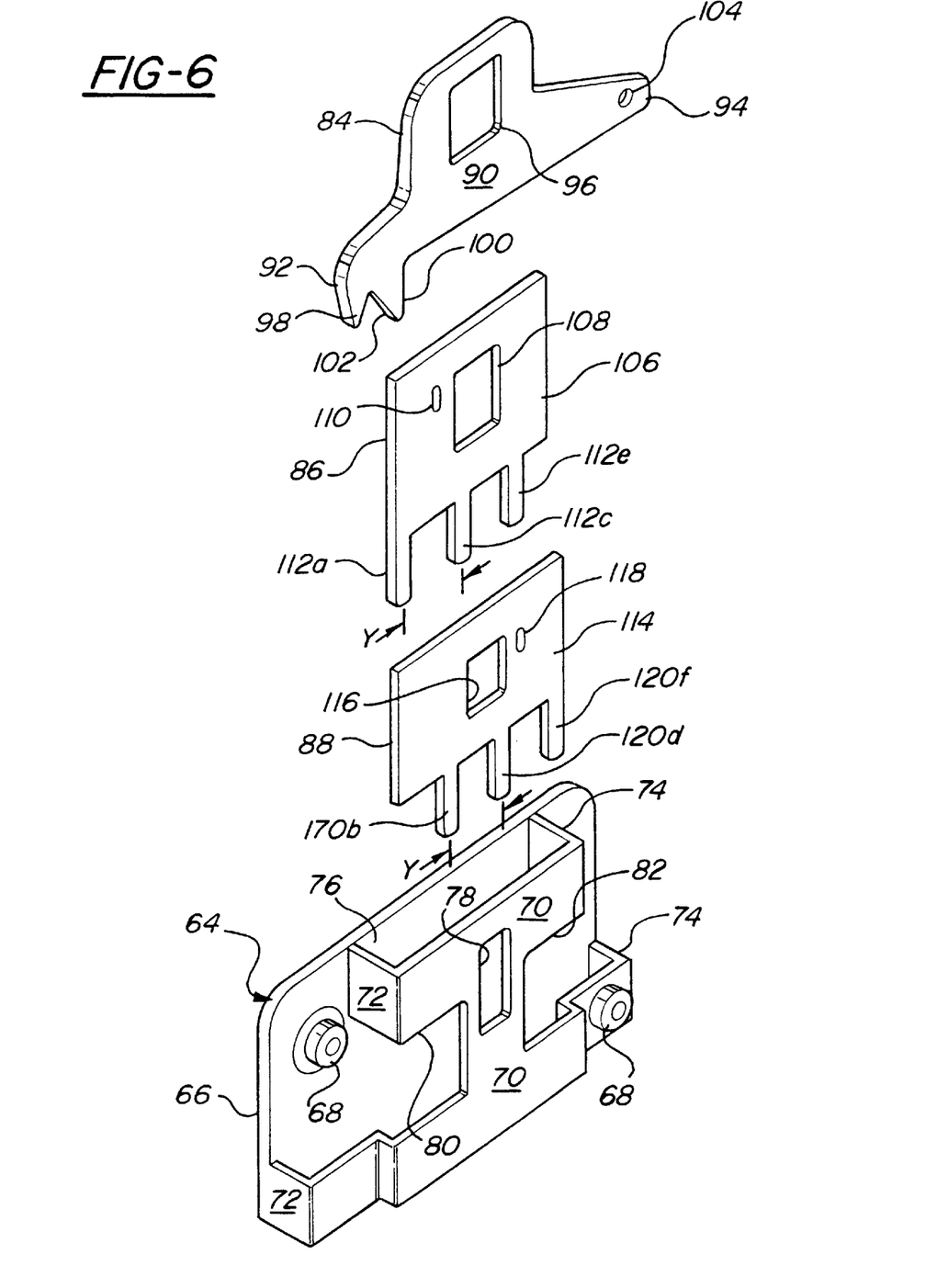
FIG. 6 is an exploded view of a housing a plurality of plates of the locking mechanism.

Referring to FIGS. 4, 5 and 6, the locking mechanism 24 further includes a housing 64. The housing 64 includes a planar back plate 66 fixedly secured to the side plate 48 of the moving lock plate 44 by fasteners 68, bolts, rivets, or the like, to seat the housing 64 directly above the upper locking plate 50. The housing 64 further includes a front plate 70 spaced from and generally parallel to the back plate 66 by opposing side walls 72, 74 to define a channel 76 in the housing 64. The front plate 70 includes a center window 78 passing therethrough and a pair of side notch openings 80, 82 providing access into the channel 76. The channel 76 is aligned with the plurality of first apertures 60 in the upper locking plate 50 of the moving lock plate 44. The housing 64 operatively supports a plurality 84, 86, 88 for generally vertical movement within the channel 76 for providing interlocking engagement between the fixed lock plate 34 and the moving lock plate 44.

Figure 7:
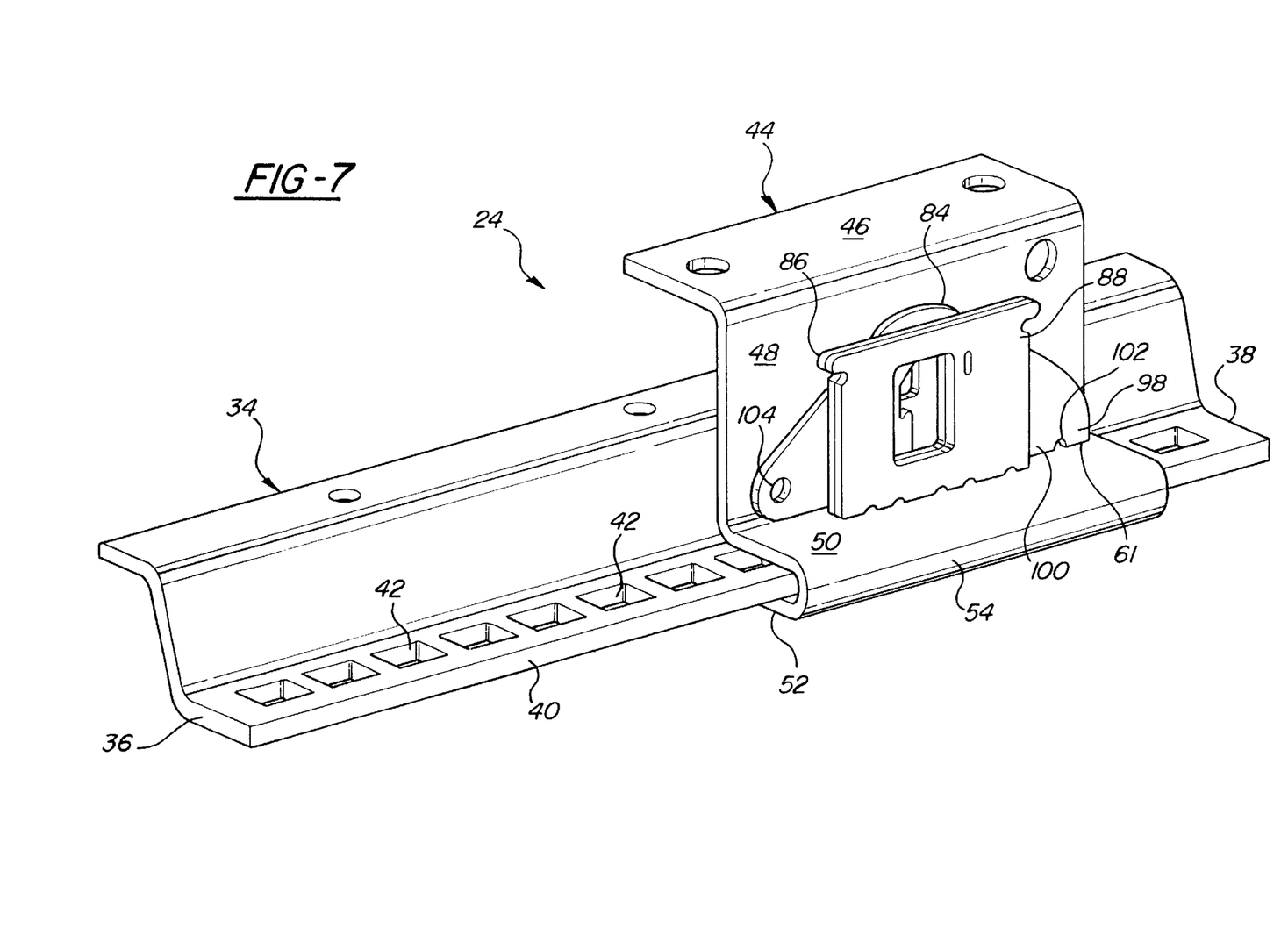
FIG. 7 is a perspective view of the plates supported on the moving lock plate with the housing removed.

More specifically, referring to FIGS. 6 and 7, a cam plate 84 includes an elongated body portion 90 extending between a first cam end 92 and a second pivot end 94. A center window 96 passes through the body portion 90 and is dimensioned to align with the center window 78 in the housing 64. A pair of cam wedge teeth 98, 100 project downwardly from the cam end 92 and are spaced apart by a V-shaped notch 102. A pivot bore 104 passes through the pivot end 94. The cam plate 84 is seated with the channel 76 of the housing 64 against the back plate 66 with the cam end 92 adjacent the side wall 72 and the pivot end 94 adjacent the side wall 74. The cam plate 84 is pivotally secured to the housing 64 by one of the fasteners 68 passing through the pivot bore 104. Thus, the cam plate 84 may pivot about the pivot bore 104 within the channel 76 between a locked position and an unlocked position. As shown in FIG. 7, with the housing 64 removed for illustrative purposes, the wedge teeth 98, 100 are seated within the cam slot 61. In the locked position, the cam plate 84 is pivoted such that the wedge teeth 98, 100 extend through the cam slot 61 and below the upper locking plate 52 to either both be received within one of the apertures 42 in the lock plate 34 or straddling the portion of the lock plate 34 between adjacent apertures 42. That is, the wedge teeth 98, 100 may be received in independent and immediately adjacent apertures 42 with the notch 102 straddling the portion of the lock plate 34 separating the adjacent apertures.

A pair of first and second shear plates 86, 88 are also operatively supported within the channel 76 of the housing 64. Referring to FIG. 7, the first shear plate 86 includes a base plate 106 having an offset window opening 108 therethrough and a spring slot 110 adjacent the opening 108. A plurality of engagement fingers 112a, 112c, and 112e project downwardly from the base plate 106. The fingers 112a,c,e are equally spaced apart and offset relative to the centerline of the base plate 106. That is, the fingers 112a,c,e are skewed to project from the base plate 106 starting from the left side of the plate 106 as shown in FIG. 7. The fingers 112a,c,e are displaced from each other, or spaced apart, by a displacement gap defined as Y. The first shear plate 86 is slidably received within the channel 76 of the housing 64 and seated against the cam plate 84, as shown in FIG. 7. The fingers 112a,c,e are dimensioned to be received through the first apertures 60a–c, respectively, in the moving lock plate 44. The first shear plate 86 is also operable between a locked position and an unlocked position. In the unlocked position, the fingers 112a,c,e are seated within the first apertures 60a–c of the upper locking plate 50, but, spaced above the fixed lock plate 34. In the locked position, the shear plate 86 slides downwardly within the channel 76 such that the fingers 112a,c,e extend through adjacent apertures 42 in the fixed lock plate 34 and into the second apertures 62a–c, respectively, of the lower locking plate 52.

The second shear plate 88 is essentially identical to the first shear plate 86. That is, the second shear plate 88 includes a base plate 114 having an offset window opening 116 therethrough and a spring slot 118 adjacent the opening 116. A plurality of engagement fingers 120b, 120d, 120f project downwardly from the base plate 114. The fingers 120b,d,f are equally spaced apart and offset relative to the centerline of the base plate 114. However, the second shear plate 88 is inverted or a mirror image relative to the first shear plate 86, as shown in FIG. 6. As a result, the fingers 120b,d,f are skewed to project from the base plate 114 starting from the right side of the plate 114 such that the fingers 120b,d,f of the second shear plate 88 are a mirror image of the fingers 112a,c,e of the first shear plate 86 wherein each of the fingers 112a,c,e and 120b,d,f are equally spaced along a longitudinal row between the side walls 72, 74 of the housing 64. The fingers 120b,d,f are also displaced from each other, or spaced apart, by an equivalent displacement gap Y. The second shear plate 88 is also slidably received within the channel 76 of the housing 64 and seat against the first shear plate 86, as shown in FIG. 7. The fingers 120b,d,f are dimensioned to be received through the first apertures 60d–f, respectively, in the moving lock plate 44. The second shear plate 88 is also operable between a locked position and an unlocked position. In the unlocked position, the fingers 120b,d,f are seated within the first apertures 60d–f of the upper locking plate 50, but, spaced above the fixed lock plate 34. In the locked position, the shear plate 88 slides downwardly within the channel 76 such that the fingers 120b,d,f extend through adjacent apertures 42 in the fixed lock plate 34 and into the second apertures 62d–f, respectively, of the lower locking plate 52.

Referring again to FIG. 4, a guide pin 122 extends through the center window 78 in the housing 64 and through each of the window openings 96, 108, 116 of the respective cam plate 84, first shear plate 86 and second shear plate 88 for actuating the plates 84, 86, 88 from the locked position to the unlocked positions as will be described in greater detail below. The release handle 28 includes a guide bore 124 for securing the guide pin 122 to the release handle 28. The guide bore 124 is spaced from the attachment of the pivot pin 30 to the release handle 28.

Figure 8:
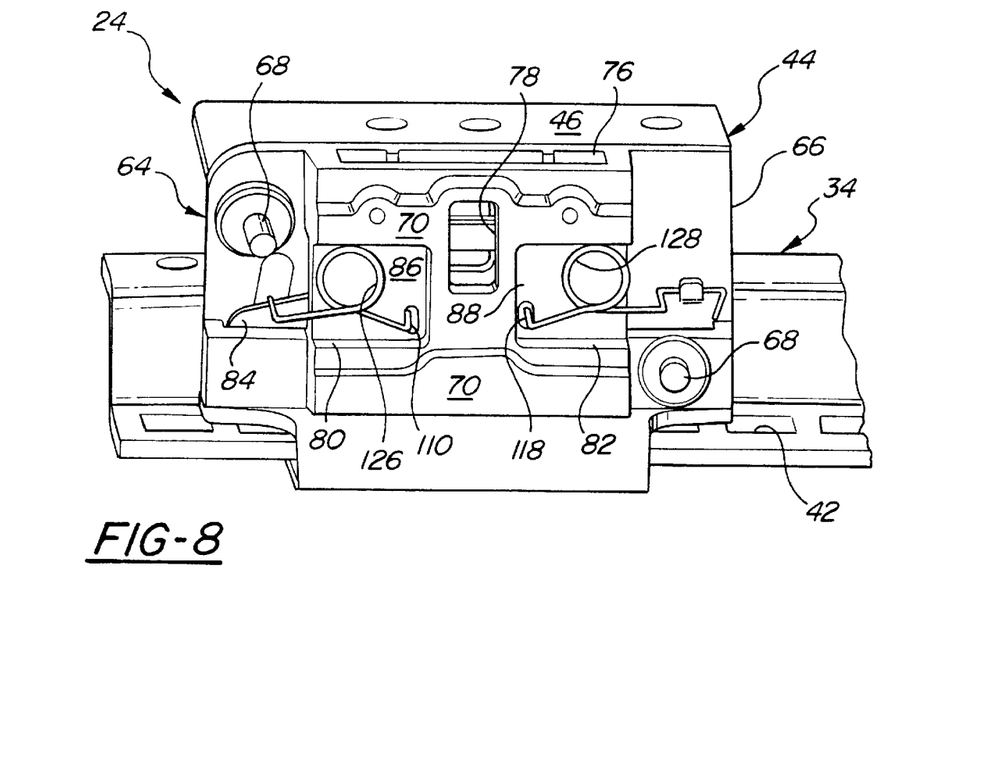
FIG. 8 is a top perspective view of the assembled locking mechanism.
Figure 9:
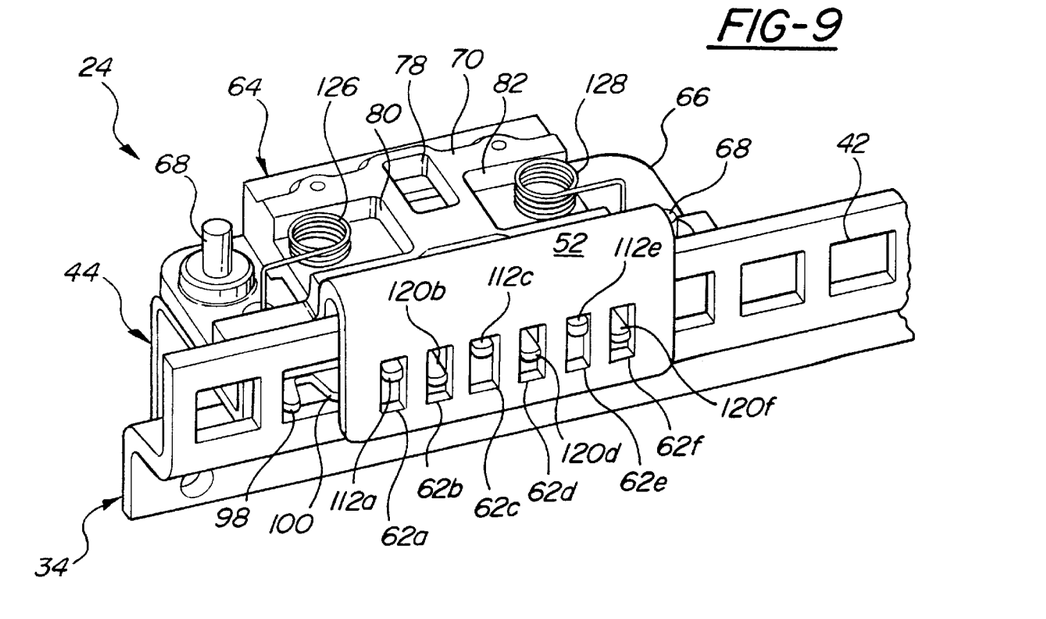
FIG. 9 is bottom perspective view of the locking mechanism of FIG. 8.
Figure 10:
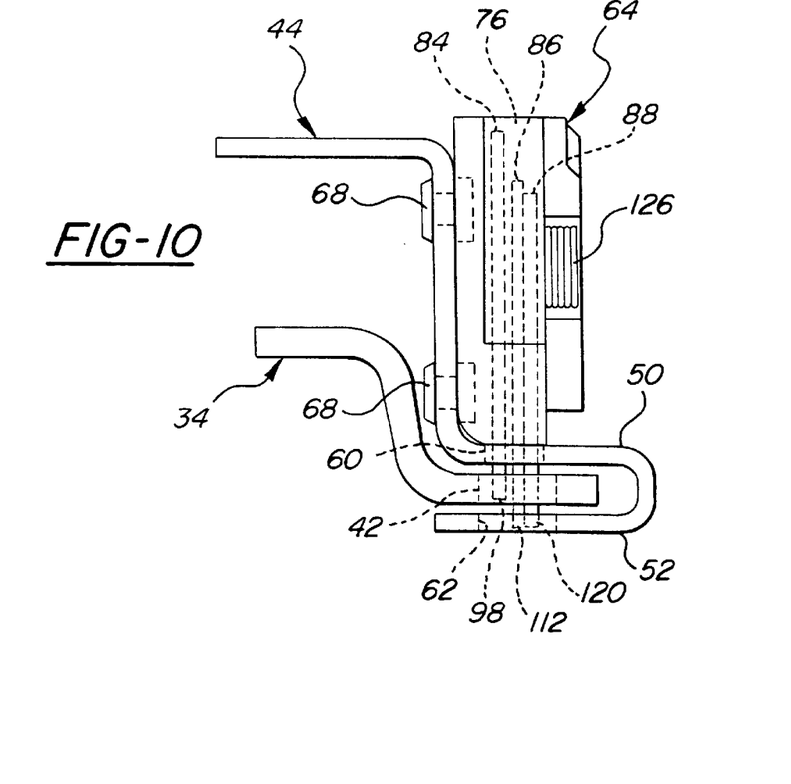
FIG. 10 is an end view of the locking mechanism of FIG. 8.

Referring to FIGS. 8–10, the locking mechanism 24 further includes a pair of biasing members 126, 128 for biasing each of the cam plate 84, first shear plate 86 and second shear plate 88 in the locked position. The biasing member 126 is a coil spring having a first end engaged with the top of the cam plate 84 and a second end received in the spring slot 110 of the first shear plate 86. The member 126 is coiled and seated within the notch 80 to bias both the cam plate 84 and shear plate 86 in the locked position. The biasing member 128 is also a coil spring having a first end secured to the back plate 66 of the housing 64 and a second end received in the spring slot 118 of the second shear plate 88. The member 128 is similarly coiled and seated within the notch 82 to bias the shear plate 88 in the locked position.

In operation, when the seat track assembly 10 is properly aligned to fully interlock the lower tracks 12, 14 with the upper tracks 16, 18, the engagement fingers 112, 120 of the first 86 and second 88 shear plates extend through the bottom of the channel 76 in the housing 64 and into the respective apertures 60, 62 of the upper 50 and lower 52 locking plates. The fingers 112, 120 also extend through the apertures 42 of the fixed lock plate 34 sandwiched between the upper locking plate 50 and lower locking plate 52, as shown in FIG. 9. More specifically, the fingers 112a, 112c and 112e extend through the apertures 60a, 60c, and 60e, respectively, of the upper locking plate 50 as well as the apertures 62a, 62c and 62e, respectively, of the lower locking plate 52. The fingers 120b, 120d and 120f extend through the apertures 60b, 60d and 60f, respectively, of the upper locking plate 50 as well as the apertures 62b, 62d, and 62f, respectively, of the lower locking plate 52. As shown in FIG. 5, with the moving lock plate 44 removed, since the width of the apertures 42 (X1) in the fixed lock plate 34 is approximate twice the width of the apertures 60, 62 (X2), the apertures 42 are capable of receiving more than one engagement finger 112, 120 of the first 86 and second 88 shear plates therethrough. That is, fingers 112a and 120b are received through a single first aperture 42a; fingers 112c and 120d are received through a single second aperture 42b adjacent to the first aperture 42a; and fingers 112e and 120f are received through a single third aperture 42c adjacent to the second aperture 42b.

Additionally, the wedge teeth 98, 100 of the cam plate 84 extend through the bottom of the channel 76 in the housing and into the cam slot 61 of the upper locking plate 50. The wedge teeth 98, 100 also further extend into one of the apertures 42 of the fixed lock plate 34. Specifically, as shown in FIG. 5, both of the wedge teeth 98, 100 are shown in the aperture 42 immediately adjacent the first aperture 42a. The cam plate 86 and wedge teeth 98, 100 provide an anti-chuck device to prevent any movement or rattle between the fingers 112, 120 and the apertures 60, 62, 42 caused by tolerance inaccuracy by being wedged between the opposing walls defining the aperture 42.

If the seat occupant desires to adjust the fore and aft position of the seat assembly via the seat track assembly 10, the occupant actuates the release handle 28 extending between the spaced apart upper tracks 16, 18, as shown in FIG. 1, by lift upwardly on the release handle 28. The release handle 28 pivots about pins 30, 32 and lifts the guide pins 122 upwardly within the center window 78 of the housing 64. The guide pin 122 engages with center window 96 of the cam plate 84 and each of the offset openings 108, 116 of the respective shear plates 86, 88 to lift each of the plates 84, 86, 88 from the locked position to the unlocked position against the biasing force of the coil springs 126, 128. The shear plates 86, 88 are lifted generally vertically within the channel 76 of the housing 64 and the cam plate 84 is pivoted about the pivot bore 104 within the channel 76. As the plates 84, 86, 88 are actuated to the unlocked position, the wedge teeth 98, 100 of the cam plate 84 are removed from the aperture 42 in the fixed lock plate 34 and the fingers 112, 120 of the respective shear plates 86, 88 are removed from the apertures 62 in the lower locking plate 52 as well as the apertures 42 in the fixed lock plate 34. With each of the plates 84, 86, 88 in the unlocked position, the upper tracks 16, 18 are free to slide relative to and along the lower tracks 12, 14 to provide fore and aft adjustment of the seat assembly.

Once the seat assembly is adjusted to the desired fore and aft position by the occupant, the release handle 28 may be released to its nominal position. The coil springs 126, 128 bias the plates 84, 86, 88 downwardly within the channel 76 from the raised unlocked position to the lower locked position. If the upper 16, 18 and lower 12, 14 tracks of the seat track assembly 10 are fully aligned, the engagement fingers 112, 120 of the shear plates 86, 88 will be forced downwardly through the channel 76 and back into engagement with, or received within, the respective apertures 60, 62 in the upper 50 and lower 52 locking plates, as well as with correspondingly aligned apertures 42 in the fixed lock plate 34 to fully interlock the upper tracks 16, 18 with the lower tracks 12, 14. Additionally, the wedge teeth 98, 100 will also be received within an aperture 42 of the fixed lock plate 34.

Figure 11:
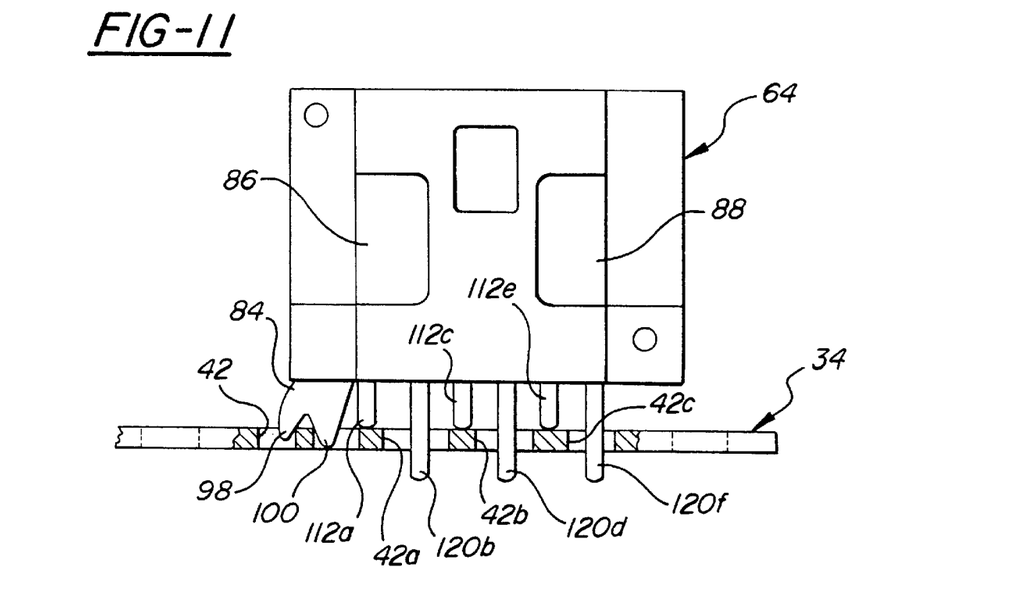
FIG. 11 is a partially sectioned front view of the locking mechanism.

The locking mechanism 24 further ensures that at least the fingers 112, 120 of one of the shear plates 86, 88 are received within the apertures 42 to interlock the upper 16, 18 and lower 12,14 tracks when the plates 84, 86, 88 and the locking mechanism 24 is in the locked position. That is, if the occupant releases the release handle 28 and each of the fingers 112, 120 are not vertically aligned with apertures 42, at least one of the shear plates 86, 88 will still engage with the fixed lock plate 44 to ensure the upper 16, 18 and lower 12, 14 tracks are interlocked and prevent further fore and aft sliding movement therebetween. Specifically, referring to FIG. 11, the release handle 28 may be release with the locking mechanism 24 in a position wherein only the fingers 120b,d,f of the second shear plate 88 are aligned with the apertures 42a, 42b, 42c. It should be appreciated that the fingers 112, 120 are always aligned with the apertures 60, 62 in the respective upper locking plate 50 and lower locking plate 52. However, these one set of the apertures 60, 62 and corresponding fingers 112, 120 may not be aligned with the apertures 42 in the fixed lock plate 44. As shown in FIG. 11, the locking mechanism 24 is position with the fingers 120b, 120d and 120f of the shear plate 88 are aligned with and received through the apertures 42a, 42b and 42c, respectively, of the fixed lock plate 34. However, the fingers 112a, 112c and 112e of the shear plate 86 are not aligned with or extending into any of the apertures 42a, 42b or 42c. In this position, the fingers 112a, 112c and 112e extend through the apertures 60a, 60c and 60e, but, engage and rest on the top portions, or ribs, of the fixed lock plate 34 between the adjacent and consecutive apertures 42, 42a, 42b and 42c. Since the width of the apertures 42 (X1) is approximately twice the width of the apertures 60, 62 (X2), and thus the width and spacing between the offset and mirrored fingers 112, 120 (Y), every other finger, i.e. 112a or 120b; 112c or 120d; 112e or 120f, will align with and be forced into the apertures 42a, 42b, 42c. This ensures that at least one of the shear plates 86, 88 of the locking mechanism 24 engages with the fixed lock plate 34 to interlock the upper tracks 16, 18 with the lower tracks 12,14 and prevent fore and aft movement therebetween in the locked position.

Additionally, the spacing of the wedge teeth 98, 100 by the V-shaped notch 102 of the cam plate 84 is still able to engage with the fixed lock plate 34 for anti-chuck and anti-rattle. Specifically, as shown in FIG. 11, the wedge teeth 98, 100 are shown straddling a portion of the fixed lock plate 34 between adjacent apertures 42 where each of the wedge teeth 98, 100 are received within a separate yet adjacent aperture 42. The portion of the lock plate 34 between the apertures 42 is wedged within the notch 102 to prevent chuck and rattle.

Therefore, the locking mechanism 24 provides infinite engagement between the upper tracks 16, 18 and lower tracks 12, 14 and ensures the tracks are interlocked and the seat assembly restrained from further fore and aft movement in the locked position whenever and wherever the occupant releases the release handle 28.

Figure 12:
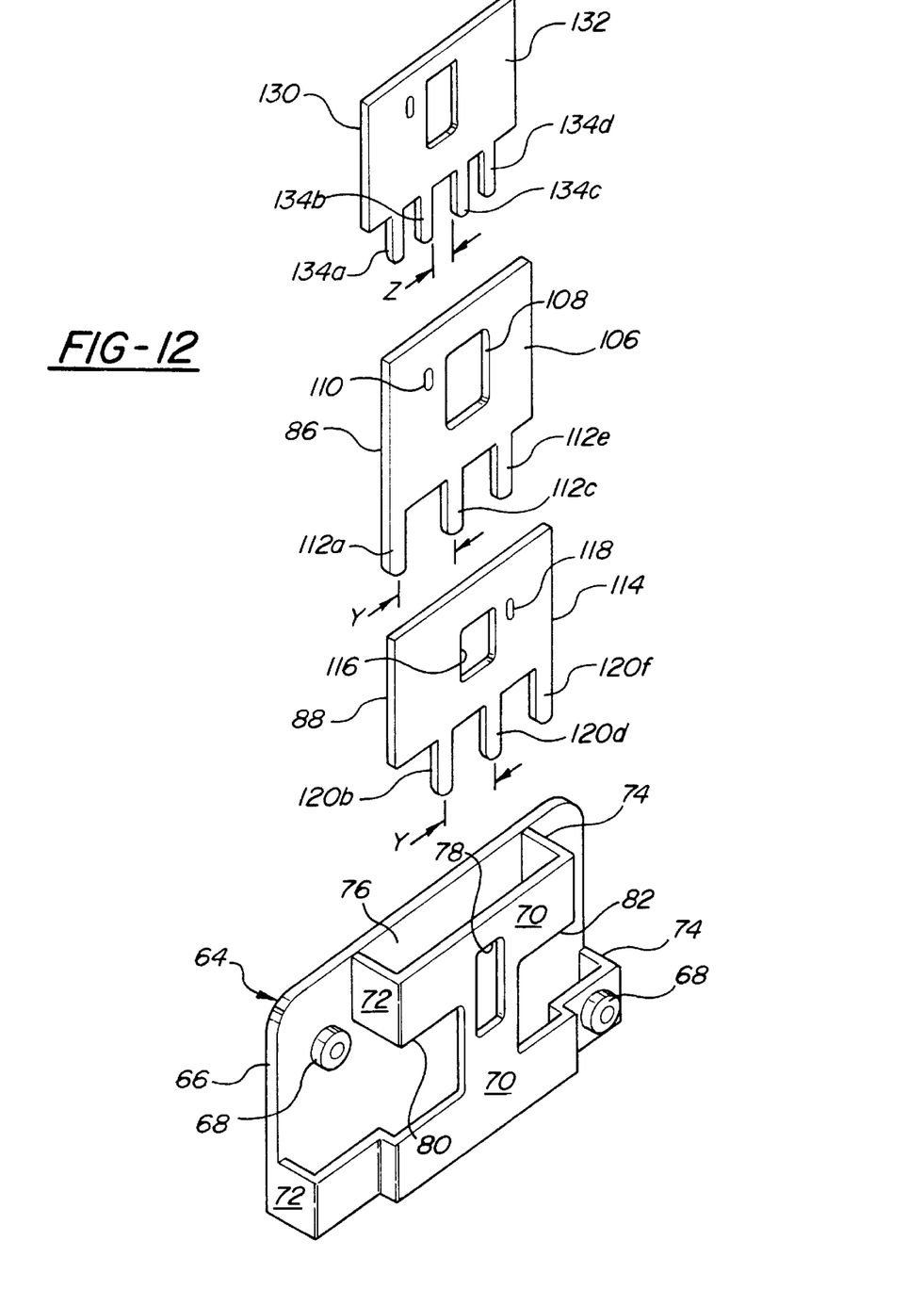
FIG. 12 is an exploded view of an alternative embodiment of plates.

In an alternative embodiment, the cam plate 84 may be substituted or replaced with a third shear plate 130 as shown in FIG. 12. The third shear plate includes a base plate 132 having a plurality of engagement fingers 134a–d projecting downwardly from the base plate 132. However, with four fingers 134a–d, the fingers 134 are not offset, but rather, spaced equally apart and centered along the bottom of the base plate 132. Further, the fingers 134 are displaced apart by a gap Z, which is less than the displacement gap Y of the fingers 112, 120 of the shear plates 86, 88. As such, the fingers 134a, 134b, 134c, 134d are received within the apertures 60b, 60c, 60d, 60e of the upper locking plate 50 and the apertures 62b, 62c, 62d, 62e of the lower locking plate 52, respectively. The fingers 134 of the third shear plate 130 are also received with the apertures 42 of the fixed lock plate 34, between the fingers 112, 120, to further reduce any gap between any of the fingers and the apertures 42. This reduces vibration, rattle and chuck similar to the cam plate 84 and also provide a third "lock" to the seat track assembly 10 in addition to the first 86 and second 88 shear plates.

Figure 13:
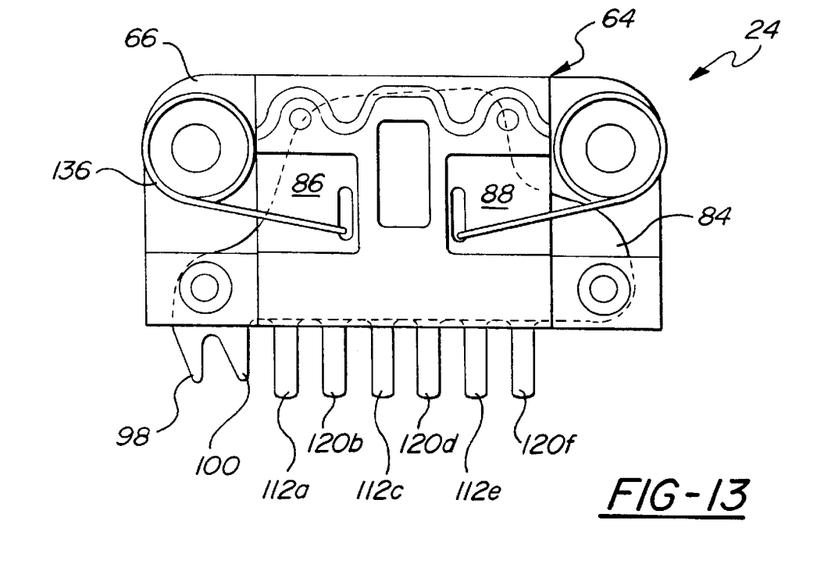
FIG. 13 is a front view of an alternative embodiment of biasing members of the locking mechanism.

Referring to FIG. 13, an alternative biasing member arrangement is shown for urging the plates 84, 86, 88 in the locked position. The arrangement includes a first torsion spring 136 attached between the back plate 66 of the housing and the shear plate 86 and a separate second torsion spring 138 attached between the back plate 66 and the shear plate 88. Additionally, a third omega spring 140 includes a first free end secured to the housing 64 and a second free end secured to the cam plate 84. The springs 136, 138, 140 each independently bias the respective plates 84, 86, 88 to the locked position engaged with the apertures 42 of the fixed lock plate 34. It should be appreciated that any number of and many other configurations of biasing members may be utilized including torsion bars, leaf springs, spring plates and the like, without varying from the scope of the invention.

Figure 14:
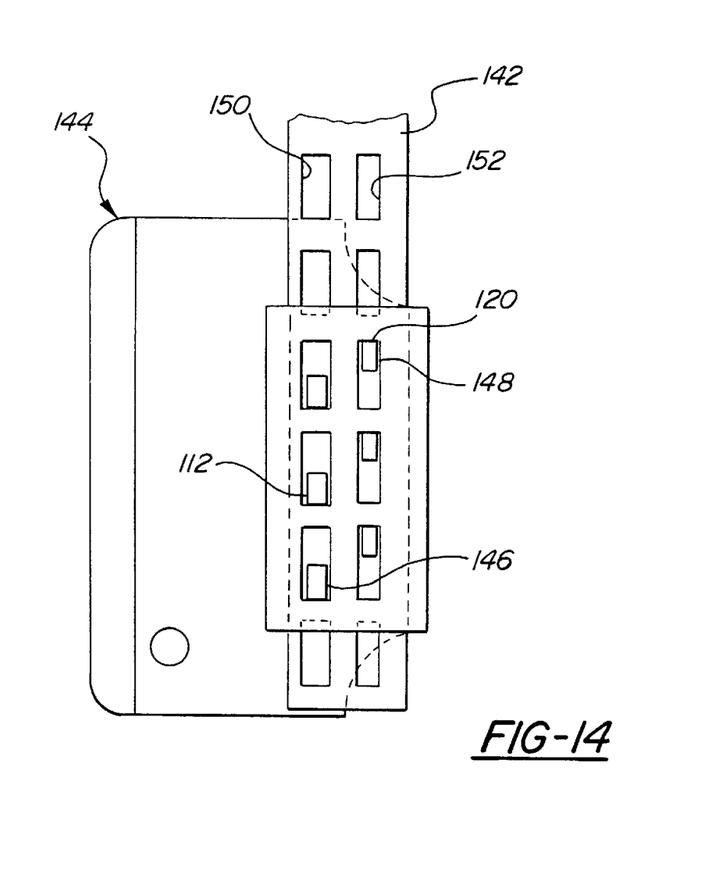
FIG. 14 is an alternative embodiment of the fixed lock plate and moving lock plate.

Referring to FIG. 14, an alternative fixed lock plate is shown at 142 and an alternative moving lock plate is shown at 144. The moving lock plate 144 includes a first row of apertures 146 aligned for receiving the fingers 112 of the shear plate 86 and a second row of apertures 148 aligned for receiving the fingers 120 of the shear plate 88. The first row of apertures 146 are spaced apart, parallel and staggered from the second row of apertures 148 for proper alignment with the offset mirror-imaged fingers 112, 120. The fixed lock plate 142 is seated between the upper locking plate 50 and lower locking plate 52 as in the preferred embodiment. The fixed lock plate 142 includes a pair of spaced apart and parallel row of locking apertures 150, 152. The first row of locking apertures 150 are aligned vertically with the row of apertures 146 while the second row of locking apertures 152 are aligned vertically with the row of apertures 148. This arrangement of rows of apertures 150, 152 allows the fingers 112, 120 to be received within independent locking apertures 150, 152 when the locking mechanism 24 is in the locked position such that the shear forces exerted on the fingers 112, 120, more particularly, the portion of the fixed lock plate 142 between the adjacent rows of apertures 150, 152 is separated and thus reduced. That is, the shear forces on the fixed lock plate 142 are spread over a greater area by separating the engagement of the fingers 112, 120 along the lock plate 142 by having independent rows of locking apertures 150, 152 associated with the respective fingers 112, 120.

Figure 15:
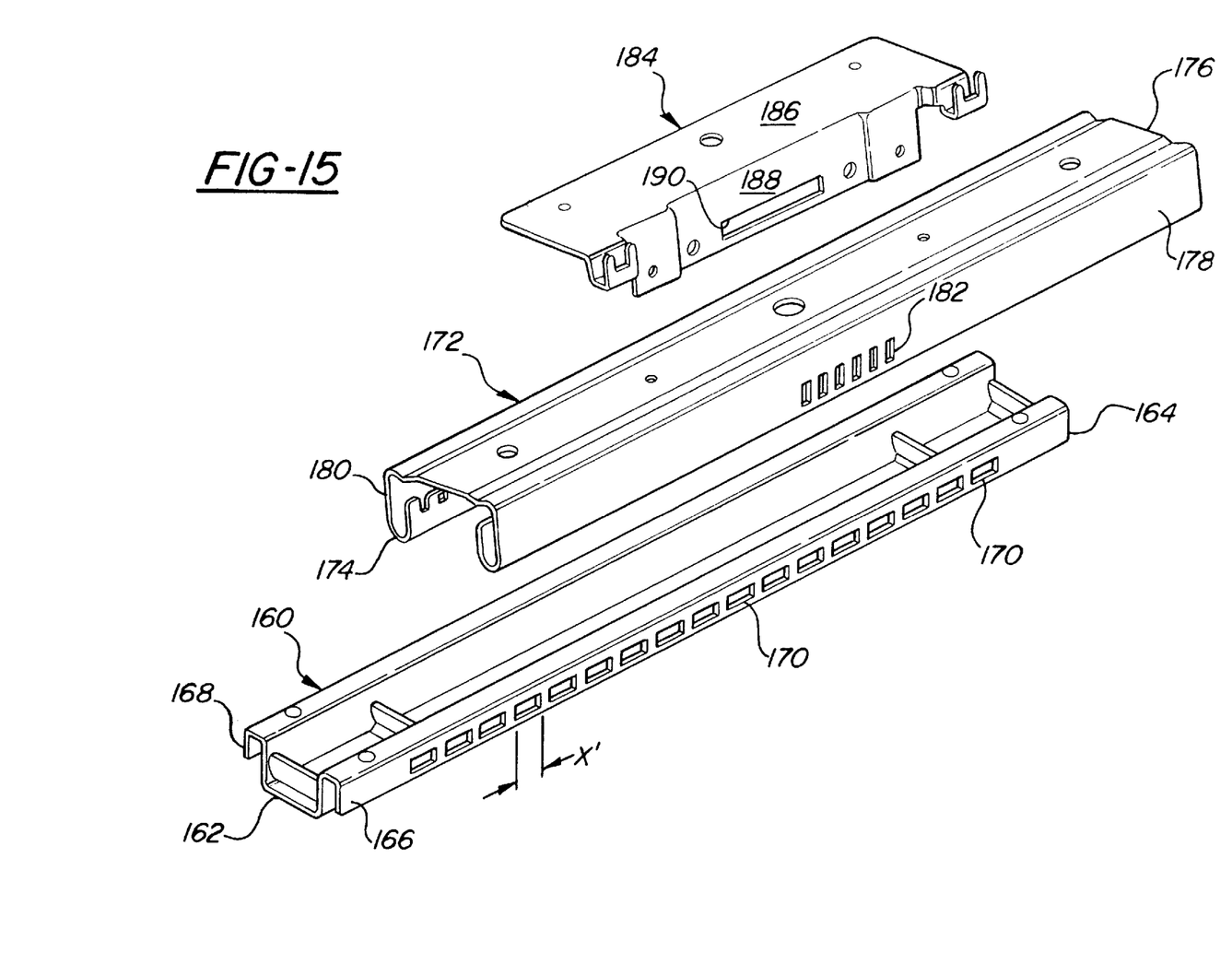
FIG. 15 is perspective view of an alternative embodiment of the upper and lower tracks and locking mechanism orientation.

Finally, FIG. 15 discloses an alternative upper and lower track configuration. The alternative embodiment of FIG. 15 includes a lower track 160 extending longitudinally between a first end 162 and a second end 164. The lower track 160 includes a pair of parallel side rails 166, 168 extending the longitudinal length of the track 160. A first plurality of spaced apart locking apertures 170 extend through the side rail 166 and form a longitudinal row of apertures 170 between the first end 162 and second end 164 of the lower track 160. An upper track 172 extends longitudinally between a first end 174 and a second end 176. The upper track 172 includes a pair of parallel side rails 178, 180 extending the longitudinal length of the track 172 for slidably engaging with the parallel side rails 166, 168 of the lower track 160. A second plurality of spaced apart locking apertures 182 extend through the side rail 178 and form a longitudinal row of apertures 182 partially between the first 174 and second 176 ends. The second row of apertures 182 are arranged to align laterally with the first row of apertures 170. An alternative moving lock plate 184 is fixedly secured to the upper track 172. The moving lock plate 184 includes a top mounting plate 186 for fixed securing the lock plate 184 to the top of the upper track 172 and a side mounting plate 188 extending downwardly and generally perpendicular from the top mounting plate 186. The side plate 188 may also be fixedly secured to the upper track 172. The side plate 188 includes a lateral slot 190 formed therethrough which overlaps with and provides an opening to the second row of apertures 182 in the side plate 178. It should be appreciated that the alternative configuration of the upper track 172, lower track 160 and moving lock plate 184 provide simply a different orientational alignment between the locking apertures 170 and row of apertures 182. That is, the side rail 166 of the lower track 160 forms the fixed lock plate of the preferred embodiment, only position vertically rather than horizontally as an integral part of the lower track 160. Similarly, the side rail 178 of the upper track 172 forms the upper locking plate and lower locking plate portions of the moving lock plate of the preferred embodiment, only also position vertically rather than horizontally to receive the side rail 166 therebetween and also form an integral part of the upper track 172. Finally, the housing 64 of the preferred embodiment may be attached to the side mounting plate 188 such that the channel 76 is aligned with the lateral slot 190. The plates 84, 86, 88 of the preferred embodiment are still slidably supported within the channel 76 of the housing and extend through the lateral slot 190 for cooperation and interlocking engagement with the apertures 170, 182 to interlock the upper track 172 relative to the lower track 160.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat track assembly for adjusting a seat assembly of an automotive vehicle comprising:
   a lower track having a first plurality of apertures;
   an upper track slidably mounted to said lower track and having a second plurality of apertures;
   a housing mounted to said upper track; and
   at least two shear plates slidably disposed within said housing and having opposing offset engagement fingers, said shear plates biased to selectively engage said first and second apertures to lock and secure said upper track to said lower track whereby said shear plates are moveable to an unlocked position disengaged from said first and second apertures enabling said sliding movement between said upper track and said lower track and at least one of said shear plates being engageable with said first and second apertures regardless of a relative position between said upper track and said lower track.

2. A seat track assembly as set forth in claim 1 wherein said housing includes a back plate fixedly secured to said upper track and a front plate spaced from said back plate by opposing side walls defining a channel therethrough for slidably receiving and guiding said shear plate between said unlocked position and said locked position.

3. A seat track assembly as set forth in claim 2 wherein said shear plates include a first shear plate having a base plate slidably positioned in said channel and supporting a plurality of equally spaced apart engagement fingers between said side walls of said housing.

4. A seat track assembly as set forth in claim 3 wherein said shear plates include a second shear plate having a base plate slidably positioned in said channel and supporting a plurality of equally spaced apart engagement fingers between side walls of said housing, said fingers of said second shear plate equally offset between said side walls from said fingers of said first shear plate.

5. A seat track assembly as set forth in claim 4 wherein said offset spacing of said fingers between said first and second shear plates allow any two adjacent finger to be received in any one of said apertures of said upper and lower track.

6. A seat track assembly as set forth in claim 5 further including a biasing member coupled between said housing and each of said shear plates for biasing said shear plates to said locked position with said finger engaged within said apertures of said upper and lower tracks.

7. A seat track assembly as set forth in claim 6 further including a guide pin operatively coupled to each of said first and second shear plates for manual sliding said shear plates within said channel against the biasing force of said biasing members between said locked position and said unlocked position to remove each of said fingers from said apertures of at least said lower track.

8. A seat track assembly as set forth in claim 7 further including a cam plate having a body portion extending between a cam end and a pivot end, said pivot end pivotally coupled to said housing for providing pivotal movement of said cam plate between an locked position engaged with at least a portion of said lower track and an unlocked position disengaged from said lower track.

9. A seat track assembly as set forth in claim 8 wherein said cam end of said cam plate includes at least a pair of wedge teeth spaced apart by a generally V-shaped notch for engaging at least one of said apertures in said lower track in said locked position to prevent incident movement between said upper and lower tracks.

10. A seat track assembly as set forth in claim 9 wherein said lower track includes a fixed lock plate extending longitudinally between opposing first and second ends and projecting outwardly from said lower track to a lateral edge, said apertures spaced apart along said longitudinal length of said lock plate between said lower track and said lateral edge.

11. A seat track assembly as set forth in claim 10 further including a moving lock plate fixedly secured to said upper track, said moving lock plate including an upper locking plate adjacent one side of said fixed lock plate and a lower locking plate adjacent the opposite side of said fixed lock plate.

12. A seat track assembly as set forth in claim 11 wherein said upper locking plate includes a first set of equally spaced apart apertures therethrough aligned axially with a second set of equally spaced apart apertures in said lower locking plate, said first and second sets of apertures aligned laterally with said apertures in said fixed lock plate.

13. A seat track assembly as set forth in claim 12 wherein said moving lock plate including a generally C-shaped portion interconnecting said upper locking plate and said lower locking plate about said lateral edge of said fixed lock plate.

14. A seat track assembly as set forth in claim 13 further including a release handle coupled to said guide pin for actuating said shear plates and said cam plate between said locked position and said unlocked position.

* * * * *